UNITED STATES PATENT OFFICE.

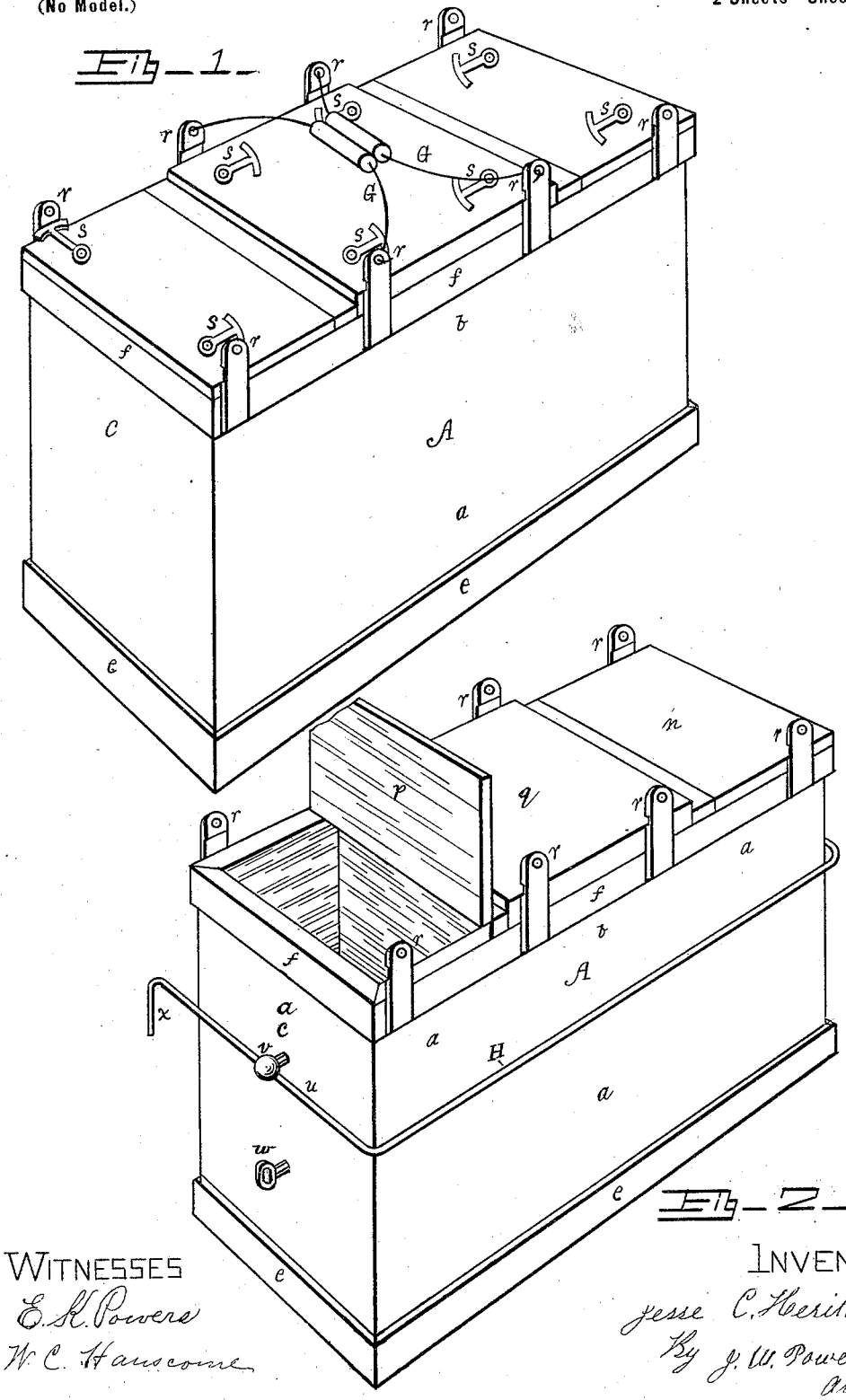

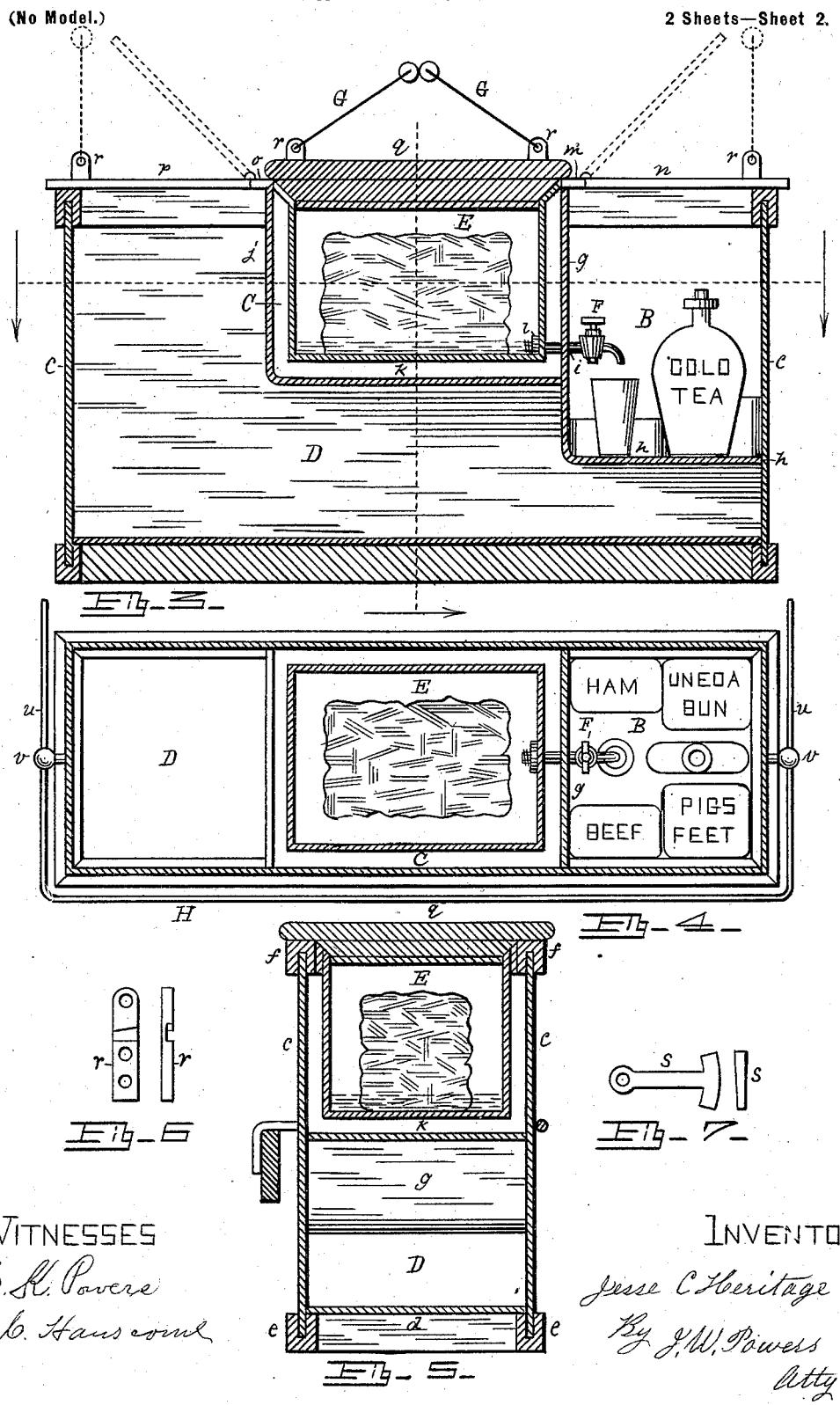

JESSE C. HERITAGE, OF MINNEAPOLIS, MINNESOTA.

SPORTSMAN'S CABINET.

SPECIFICATION forming part of Letters Patent No. 686,067, dated November 5, 1901.

Application filed July 15, 1901. Serial No. 68,446. (No model.)

*To all whom it may concern:*

Be it known that I, JESSE C. HERITAGE, a citizen of the United States, residing at No. 1015 Nicollet avenue, Minneapolis, in the county of Hennepin and State of Minnesota, have invented new and useful Improvements in Sportsmen's Cabinets, of which the following is a full, clear, and exact description, reference being had to the accompanying drawings, which form a part of this specification.

My invention relates to transportation-cases for fish and game; and my invention consists of a cabinet embodying a compartment adapted to serve as a lunch-box, another one adapted to serve as a receptacle for the fish or game, and still another one adapted to hold a supply of ice, the purpose of my invention being, first, the production of a cabinet in which a lunch may be carried and wherein it may be preserved in a fresh, cool, and palatable condition; second, the provision of a cabinet wherein the fish or game secured may be transported in a clean, cool, and edible condition, and, third, the production of a cabinet wherein a sufficient quantity of ice may be transported to preserve the before-mentioned lunch and game.

To these ends my invention consists of the cabinet illustrated in the accompanying drawings, in which Figure 1 is a perspective of the device closed for transportation; Fig. 2, the same with one compartment (the receptacle for the fish or game) opened; Fig. 3, a longitudinal vertical section; Fig. 4, a longitudinal horizontal section; Fig. 5, a vertical cross-section, and Figs. 6 and 7 details.

Similar letters refer to similar parts throughout the several views, and the following specification is a description thereof.

The case or cabinet A, I preferably fashion as herein shown, being partly of wood and partly of sheet metal, its size and proportions not being an essential feature of my invention. The body portion $a$ I make of sheet metal, it being a rectangular box having parallel sides $b$, parallel ends $c$, and a bottom $d$, the whole being properly interlocked and soldered to render it water-tight. The bottom $d$, as will be seen, is located a little way (about an inch) above the lower edges of the side and end pieces. Onto the downwardly-projecting edges of the side and end portions $b$ and $c$ I now affix the base-strips $e$, and to the upper edges of the same I affix the cap-pieces $f$. These base-strips and cap-pieces are identically alike, being strips of wood about two (2) inches wide and about one (1) inch thick, the same having grooves in one of their edges, which grooves are adapted to receive the under and upper edges of the case. This base and cap stock may be made in long strips, then cut to measurement, mitered, and fitted in place, where they are secured by nails driven into the wood and through the sheet metal, the base-strips $e$ serving as a support for the sheet-metal bottom $d$ and the cap-pieces $f$ serving to stiffen and to hold the top of the case A in shape. If desirable, a board bottom may be fitted within the base-strips $e$ below the bottom $d$, as shown in Fig. 3. I now divide my case A into the three hereinbefore-mentioned compartments. The lunch-box is preferably located at one end of my cabinet A and (measuring horizontally) occupies about one-quarter ($\frac{1}{4}$) of the area thereof, while (measuring vertically) it extends about two-thirds ($\frac{2}{3}$) of the depth thereof, and therefore occupies about two-twelfths ($\frac{2}{12}$) of the cabinet. It is fashioned by and separated from the remaining portion of the cabinet A by means of the vertical wall $g$, which forms one of its sides, (the end of the cabinet forming its other side,) and the horizontal wall $h$, which forms its bottom. The side wall $g$ is pierced near its lower edge, having the opening $i$ therein, for purposes which will hereinafter be set forth.

The ice-chest C is preferably located at the middle upper portion of my cabinet A and (measuring horizontally) occupies about one-half ($\frac{1}{2}$) the area thereof, while (measuring vertically) it extends about one-half ($\frac{1}{2}$) the depth thereof, and therefore occupies about one-quarter ($\frac{1}{4}$) of my cabinet, thereby leaving about seven-twelfths ($\frac{7}{12}$) of my cabinet for the fish and game box D. This compartment (the ice-chest) is fashioned by the second vertical wall $j$, which forms one of its ends, (the vertical side wall $g$ of the lunch-box B forming its other end,) and by the horizontal wall $k$, which forms its bottom. The purpose in having the bottom of the lunch-box B at a lower level than that of the ice-chest C is to provide for drainage from the latter to the former for purposes which will hereinafter be set forth. The removable ice-tray E is fashioned in the same proportion, but somewhat smaller than the ice-chest C, to the end that when in place therein there will be a "dead-air" space between their respective walls. This tray E consists of a rectangular box having parallel sides, parallel ends, and a bottom, the five portions being interlocked and soldered to render them water-tight. It is suspended from the upper edges of the vertical walls of the ice-chest C and does not extend to the bottom thereof. Thus the dead-air space above referred to extends below as well as around the tray E. One end of this ice-tray E, the end next the lunch-box B, is pierced near its lower edge and has a threaded flange or bushing *l* affixed thereto, which bushing is in line (in register) with the opening *i* in the end wall *g* of the lunch-box B.

A detachable faucet F, having its discharge end within the lunch-box B, has its intake end screwed into the before-mentioned flange or bushing *l* of the ice-tray E, its intermediate portion extending through the vertical wall *g* and the dead-air space. It serves to draw drinking-water from the ice-tray E.

A bar of wood *m* extends across the cabinet A on top of the vertical wall *g*, to which the lid *n* of the lunch-box B is hinged, and a similar bar of wood *o* extends across the cabinet A on top of the vertical wall *j*, to which the lid *p* of the game-box D is hinged.

The lid of the ice-chest C rests upon the cap-pieces *f* and between the parallel cross-pieces *m* and *o*, to which the lids *n* and *p* are hinged.

To each of the side cap-pieces *f* I affix four (4) laterally-grooved lugs or ears *r*, (four pairs,) into which the detachable carrying-bails G may be snapped. These lugs *r* are in pairs and are disposed in order, one of each pair being set diametrically opposite its mate. These lugs *r*, besides serving to receive the carrying-bails G, are adapted to serve as clamps to hold the lids *n*, *p*, and *q* securely in place, being laterally grooved in their inner sides to receive the clamping-latches *s*. These latches *s* are in like manner disposed in order, being pivotally affixed to their respective covers and directly in line with the lugs *r*, with which they respectively engage or interlock. Each of the lids *n* and *p* has two latches and the lid *q* has four latches.

I further provide my cabinet with means for hanging it up, (either from the side of the boat or elsewhere,) which means consists of the longitudinal bail H, permanently but adjustably affixed in its ends C. The configuration of and manner of affixing this bail H to the cabinet A is an important feature of my invention and is as follows: I take a metal rod of the proper length and bend its two ends laterally in the same direction, forming the parallel portion *u*, which parallel portions are far enough apart to admit the cabinet A longitudinally between them. I next pierce the ends C of the cabinet A, making two perforations in each end, which perforations are located on vertical lines which would equally divide the said ends, one pair of said perforations being located about one-third ($\frac{1}{3}$) the depth of the cabinet from its top and the other pair being about one-third ($\frac{1}{3}$) the height of the cabinet from its bottom. Into the upper pair of perforations I insert screw-eyes *v*, upon the inner threaded ends of which I screw threaded nuts, which I also solder to prevent their turning off, but leave the screw-eyes *v* loose, and hence revoluble in the pierced end pieces C. Into the lower pair of perforations I insert other screw-eyes *w*, upon the inner threaded ends of which I screw other threaded nuts, which I also solder both to the screw-eyes *w* and to the inner sides of the ends C, thereby affixing them rigidly therein, having their eyes or openings extending through them horizontally. I now run the laterally-bent portions *u* of the bail H through the upper pair of screw-eyes *v* and bend their ends downward, thus forming the hooks *x*, by means of which I may hang my cabinet upon the edge of the boat or to any other convenient object. This bail H when not serving as a grappler to suspend the cabinet, as above described, and when placed in a vertical position its downwardly-bent portion *x* (now horizontal) may be inserted in the lower pair of screw-eyes *w*, thus forming a hanger by means of which my cabinet may be suspended from an overhead object.

It is noticeable that by unscrewing and removing the faucet F the ice-tray E may be removed from the ice-chest C and that my cabinet may be cleaned and renovated, each and every compartment thereof being adapted to be opened and aired.

Having thus described my invention and set forth its desirable features, what I claim as new, and desire to secure by Letters Patent, is—

1. In a sportsman's cabinet, the combination of a receptacle for refreshments; an ice-chest adjacent thereto, said ice-chest having its bottom above or on a higher plane than the bottom of the said receptacle for the refreshments; a removable ice-tray suspended or supported within the said ice-chest, whereby there may be a dry or "dead air" space between the said ice-chest and the said ice-tray; a removable faucet, the intake end of which is secured in the wall of the said ice-tray, and the discharge end and key of which is within the said refreshment-receptacle; a receptacle for fish or game adjacent to, or underlying the said ice-chest, and the said receptacle for refreshments; lids or covers for the said receptacles; and clamping devices to secure the said three covers in place, said clamping devices embodying laterally-grooved lugs adapted to receive the detachable carrying-bails; substantially as shown and for the purposes specified.

2. In a sportsman's cabinet, having a lunch-box, an ice-chest and a game-receptacle, the means for suspending the said cabinet from the side of a boat, which means consist of screw-eyes pivotally affixed in the ends of the said cabinet; a bail, the laterally-bent portions of which extend horizontally through the eyes of the said pivotally-affixed screw-eyes, and having the ends of the said laterally-bent portions, again bent laterally downward, thereby forming hooks or grapplers, adapted to overlap the edge of a boat, or other horizontal support, and to sustain the same in an upright position; other screw-eyes rigidly affixed in the ends of the said cabinet, said eyes being adapted, when the said bail is raised, to a vertical position, to receive the downwardly-bent ends or hooks of the said bail, thereby constituting a rigid hanger, by means of which the said cabinet may be suspended from an overhead object, substantially as shown and for the purposes specified.

JESSE C. HERITAGE.

Witnesses:
L. EDWARDS,
PETER M. SCHOLL.